US008561645B2

(12) United States Patent
Leroux et al.

(10) Patent No.: US 8,561,645 B2
(45) Date of Patent: Oct. 22, 2013

(54) TWO-SHUTTER THREE-WAY VALVE

(75) Inventors: Samuel Leroux, Poissy (FR); Laurent Albert, Vallangoujard (FR); Mathieu Lallemant, Maison Laffitte (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 397 days.

(21) Appl. No.: 12/811,116

(22) PCT Filed: Dec. 18, 2008

(86) PCT No.: PCT/FR2008/001781
§ 371 (c)(1),
(2), (4) Date: Jan. 5, 2011

(87) PCT Pub. No.: WO2009/106727
PCT Pub. Date: Sep. 3, 2009

(65) Prior Publication Data

US 2011/0114211 A1 May 19, 2011

(30) Foreign Application Priority Data

Jan. 3, 2008 (FR) ..................................... 08 00024

(51) Int. Cl.
*F16K 11/085* (2006.01)
*F16H 1/20* (2006.01)

(52) U.S. Cl.
USPC ................ 137/637.1; 251/250.5; 123/568.24; 74/665 GA

(58) Field of Classification Search
USPC .................... 137/637, 637.1, 875; 251/250.5; 123/568.12, 568.2, 568.23, 568.24; 74/665 G, 665 GA
See application file for complete search history.

(56) References Cited

U.S. PATENT DOCUMENTS

| | | | | | |
|---|---|---|---|---|---|
| 3,572,656 | A | * | 3/1971 | Oshima | 261/23.2 |
| 4,295,491 | A | * | 10/1981 | Galloway | 137/625.46 |
| 4,749,004 | A | * | 6/1988 | Peash | 137/865 |
| 4,924,840 | A | * | 5/1990 | Wade | 123/568.19 |
| 5,427,141 | A | * | 6/1995 | Ohtsubo | 137/595 |
| 5,448,974 | A | | 9/1995 | Toda | |

(Continued)

FOREIGN PATENT DOCUMENTS

| | | | |
|---|---|---|---|
| DE | 102004044894 | A1 | 3/2006 |
| DE | 102005048911 | A1 | 4/2007 |

(Continued)

OTHER PUBLICATIONS

English language abstract for DE102004044894 extracted from espacenet.com database, dated Nov. 2, 2010, 11 pages.
English language abstract for DE102005048911 extracted from espacenet.com database, dated Nov. 2, 2010, 13 pages.
English language abstract for FR2806448 extracted from espacenet.com database, dated Nov. 2, 2010, 28 pages.

(Continued)

*Primary Examiner* — John Fox
(74) *Attorney, Agent, or Firm* — Howard & Howard Attorneys PLLC

(57) ABSTRACT

A three-way valve (1) with two flaps (5, 6) respectively positioned in two of the three paths (2, 3) of the valve and comprising means (7-12) for controlling and actuating the flaps (5, 6) to make them pivot from one to the other of two positions in which the paths (2, 3) are either open or closed. Single control means (7) are provided for both flaps (5, 6), and there are actuating means (9-12) designed to be controlled by the single control means (7) and to actuate the two flaps (5, 6) with a temporal phase shift.

7 Claims, 5 Drawing Sheets

(56) References Cited

U.S. PATENT DOCUMENTS

| | | | | |
|---|---|---|---|---|
| 7,267,139 | B2 * | 9/2007 | Blomquist et al. | 137/607 |
| 7,992,589 | B2 * | 8/2011 | Albert et al. | 137/637.1 |
| 2005/0145229 | A1 | 7/2005 | Eriksson et al. | |
| 2005/0193978 | A1 | 9/2005 | Ishikawa | |
| 2005/0241702 | A1 | 11/2005 | Blomquist et al. | |
| 2008/0223038 | A1 | 9/2008 | Lutz et al. | |

FOREIGN PATENT DOCUMENTS

| | | | |
|---|---|---|---|
| EP | 1103715 | A1 | 5/2001 |
| EP | 1555409 | A1 | 7/2005 |
| FR | 2806448 | A1 | 9/2001 |
| FR | 2879712 | A1 | 6/2006 |
| WO | WO 2007089771 | A2 | 8/2007 |
| WO | WO 2009106725 | A1 | 9/2009 |
| WO | WO 2009106726 | A1 | 9/2009 |

OTHER PUBLICATIONS

English language abstract for FR2879712 extracted from espacenet.com database, dated Nov. 2, 2010, 15 pages.

U.S. Appl. No. 12/811,120, filed Jun. 29, 2010, “Motor Vehicle Internal Combustion Engine EGR Loop”, 8 Pages, English translation for WO 2009/106725.

U.S. Appl. No. 12/811,114, filed Jun. 29, 2010, “Motor Vehicle Internal Combusion Engine EGR Loop”, 15 pages, English translation for WO 2009/106726.

PCT International Search Report for PCT/FR2008/001779, dated Jul. 9, 2009, 4 pages.

PCT International Search Report for PCT/FR2008/001780, dated Jul. 13, 2009, 3 pages.

PCT International Search Report for PCT/FR2008/001781, dated Jul. 9, 2009, 4 pages.

* cited by examiner

TWO-SHUTTER THREE-WAY VALVE

RELATED APPLICATIONS

This application claims priority to and all the advantages of International Patent Application No. PCT/FR2008/001781, filed on Dec. 18, 2008, which claims priority to French Patent Application No. FR 08/00024, filed on Jan. 3, 2008.

The invention relates to a three-way valve with two flaps, and this invention has arisen out of a problem with the EGR loop of a motor vehicle internal combustion engine, comprising, with reference to the attached FIG. 7, the engine 21, a combustion gas exhaust manifold 22, a turbocharger 24, a turbine 25, the exhaust gas recirculation (EGR) loop 28 with a cooler 29 and the low-pressure three-way valve 30 positioned upstream of the turbocharger 24 compressor 26 and connected thereto by its outlet and comprising two inlets for receiving fresh air and the cooled exhaust gases in a mixture the pressure of which is increased in the compressor 26, and an engine intake manifold 23 for receiving the exhaust gases and the air from the compressor.

The three-way valve could equally be located on the cold side of the engine, with an inlet downstream of the turbocharger compressor and the two outlets connected respectively to the exhaust and to the cooler of the EGR loop.

The purpose of the EGR loop is to reduce the emissions of nitrogen dioxide by reducing the combustion temperature, by slowing the combustion of the oxidant mixture and absorbing some of the energy. The cooler in the EGR loop is there to drop the combustion temperature at high speed (high load).

Turning our attention back to the three-way valve positioned on the intake manifold side, the cold side, there are a number of conceivable modes for operating the three-way valve and therefore the engine: the engine can receive only fresh air, without any recirculated exhaust gas. The engine can receive fresh air mixed with some of the exhaust gases, the pressure difference between the exhaust and the intake sides of the engine being enough to recirculate the exhaust gases. When the pressure difference is not high enough to recirculate the exhaust gases and provide the correct EGR ratio, a back pressure can be created by throttling the exhaust path downstream of the EGR loop in order thus to force some of the exhaust gases toward the engine intake path. Because of its complexity, however, this solution is not very satisfactory and it is preferable to use the EGR loop in the following way:

with the fresh air flow rate in the air inlet path of the EGR valve set at a maximum, the path for the EGR gases in the valve is progressively opened, and before the EGR gas flow rate in the valve increases any further, the fresh air inlet path is progressively closed in order to continue to cause the EGR gas flow rate to increase on an increasing monotonous curve.

The present invention relates firstly, but not exclusively, to a three-way valve with two flaps so that the EGR loop can be used in the way defined hereinabove and which is as cost-effective and compact as possible. Naturally, the Applicant Company does not intend to limit the application of the valve of the invention to the use expounded hereinabove of the EGR loop, and this is why the invention will, in general, relate to any three-way valve with two flaps or shutters that have to be actuated with a temporal phase shift. In this case, the case mentioned hereinabove, the two flaps are positioned in the two inlet paths of the valve, in the other, in the two outlet paths.

Thus, the invention relates to a three-way valve with two flaps respectively positioned in two of the three paths of the valve and comprising means for controlling and actuating the flaps to make them pivot from one to the other of two positions in which the paths are either open or closed, characterized in that single control means are provided for both flaps and there are actuating means designed to be controlled by the single control means and to actuate the two flaps with a temporal phase shift.

For preference, the control means comprise a dc motor the actuating means comprise a drivetrain the input to which comes from a toothed pinion of the shaft of the control motor and which meshes with an intermediate cylindrical gearwheel with two coaxial tooth set which have different gear ratios respectively, the intermediate gear collaborates with two annulus gears that rotate as one with the two flaps.

In the preferred embodiment of the valve of the invention, the flaps are positioned in its two inlet paths, the valve then being an EGR loop valve for the cold side, connected to the intake manifold of a motor vehicle internal combustion engine.

The invention will be better understood from the following description of a mode of use of the three-way valve of the invention and of the three-way valve itself, with reference to the attached drawing in which:

FIGS. 1*a*, 1*b*, 1*c*, 1*d* illustrate the four modes of use of the three-way valve of the EGR loop, the special use of which is described below;

FIGS. 2*a*, 2*b*, 2*c* represent the curves of air flow rate (1*a*), of the natural flow rate of EGR exhaust gases (dgn) and of the flow rate, forced according to the method of use, of EGR exhaust gases (dgf), as a function of the angular positions ($\alpha$) of the corresponding flaps;

Figure 1A:
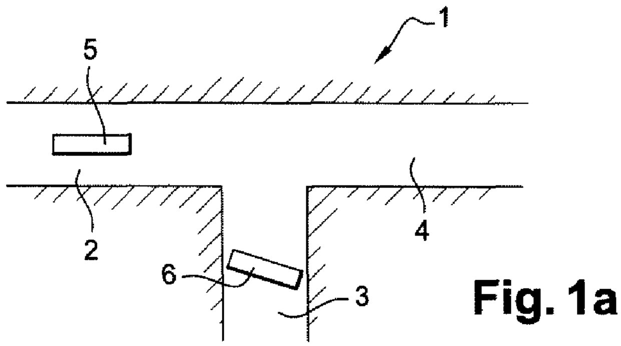
Figure 1B:
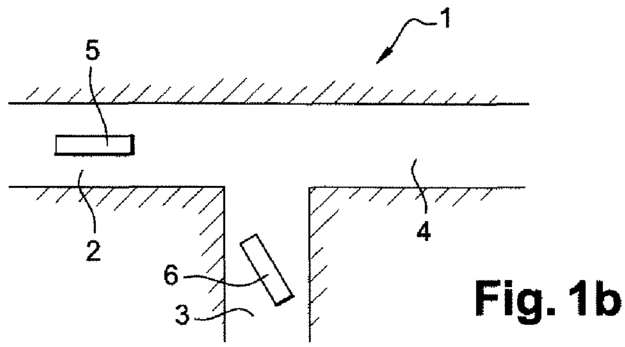
Figure 1C:
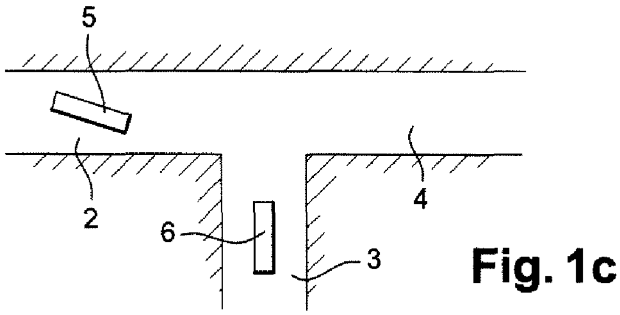
Figure 1D:
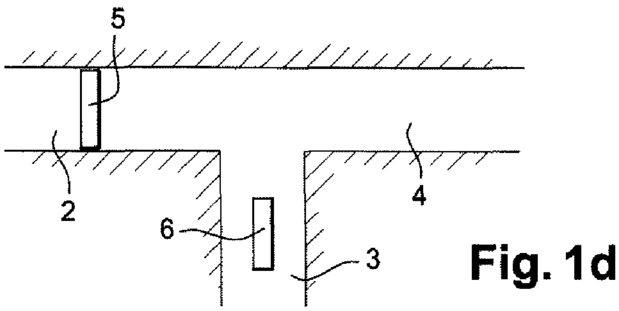

The EGR valve 1 of FIGS. 1*a*, 1*b*, 1*c* schematically comprises an air inlet 2, a recirculated exhaust gas inlet 3 and an air and gas outlet 4.

The valve 1 here is a valve with two flaps, one flap 5 in the air inlet path 2 and one flap 6 in the gas inlet path 3.

First of all, the air flap 5 is in an angular position (0°) that allows a maximum air flow rate through the path 2 and the gas inlet flap 6 is in an angular position (90°) that shuts off the path 3.

Then, without the air flap 5 pivoting, the gas inlet flap 6 begins to pivot in order progressively to open the path 3 to the EGR exhaust gases (FIG. 1*a*). This is region I of the curves 2. Next, with the air flap 5 remaining in the same position in which the air inlet 3 is wide open, the gas flap 6 pivots in order to open the gas path 6 considerably (FIG. 1*b*). This is region II of the curves 2. When the gas flap 6 is in a certain angular position, in this instance 35°, that is to say after it is rotated through 55°, the flow rate of gases in the path 3 increases practically no further and, while continuing to pivot the gas flap 6, the air flap 5 starts to be pivoted in order to close the air inlet path 2, with a corresponding temporal offset, thus forcing the engine to take in more EGR gas (1*c*).

This is the start of region III of the curves 2, the exhaust gas flow rate curve passing through a point of inflexion and continuing to rise.

This region III continues until the gas flap 6 reaches the angular position ○° in which the gas inlet path 3 is wide open and the air flap is in the angular position (90°) in which the air inlet path 2 is shut off.

In order to drive the three-way EGR valve in the way defined hereinabove, this three-way valve has the drivetrain that will now be described with reference to FIGS. 3 to 5.

The drivetrain of the three-way valve 1 comprises a gear set here extending between a DC motor 7 and two shafts 51, 61 that turn the air flap 5 and the gas flap 6 respectively. The two shafts 51, 61 run parallel to one another.

Secured to the shaft 14 of the motor 7 is a drive pinion 8 that drives an intermediate gear wheel 9 bearing a peripheral tooth set 10 and a central tooth set 11.

The peripheral tooth set 10 of the intermediate wheel meshes with an annulus gear 12 that drives the rotation of the air flap 5. The annulus gear 12 is free to rotate with respect to the spindle 51 of the flap 5. This flap 5 is rotationally driven by the annulus gear 12 via a driving pin 15 which itself rotates as one with the spindle 51 of the flap 5. This pin 15 when at rest lies against an adjustable end stop 16 secured to the valve body (not depicted). The annulus gear 12 comprises an angular cutout 17 designed to allow the annulus gear 12 to rotate freely over a defined angular sector without driving the pin 15, that is to say the flap 5. It is when the annulus gear 12 is rotated beyond this angular sector, in one direction or the other, that the edge of the cutout 17 then drives the pin 15.

The central tooth set 11 of the intermediate wheel 9 for its part meshes with an annulus gear 13 for driving the rotation of the gas flap 6. The annulus gear 13 rotates as one with the spindle 61 of the flap 6.

The flap 6 is therefore rotationally driven directly by the rotation of the annulus gear 13, while the flap 5 is rotationally driven only when the annulus gear 12 is driving the rotation of the pin 15.

In the example considered, the motor 7, via its pinion 8, driven in the counterclockwise direction, drives the rotation of the intermediate wheel 9 in the clockwise direction. The wheel 9 in turn, via its tooth sets 10, 11, drives the two annulus gears 12, 13 in the counterclockwise direction, these two annulus gears therefore being rotated by the same intermediate wheel 9 but via two different tooth sets 10, 11. The gearing ratio between the shaft 14 of the motor 7 and the gas flap 6 is 15.67 here, the ratio between the shaft 14 and the air flap 5, when the latter is being driven, being 6.67.

The mechanism for phase-shifting the closing of the air flap 5 will now be described.

Figure 3:
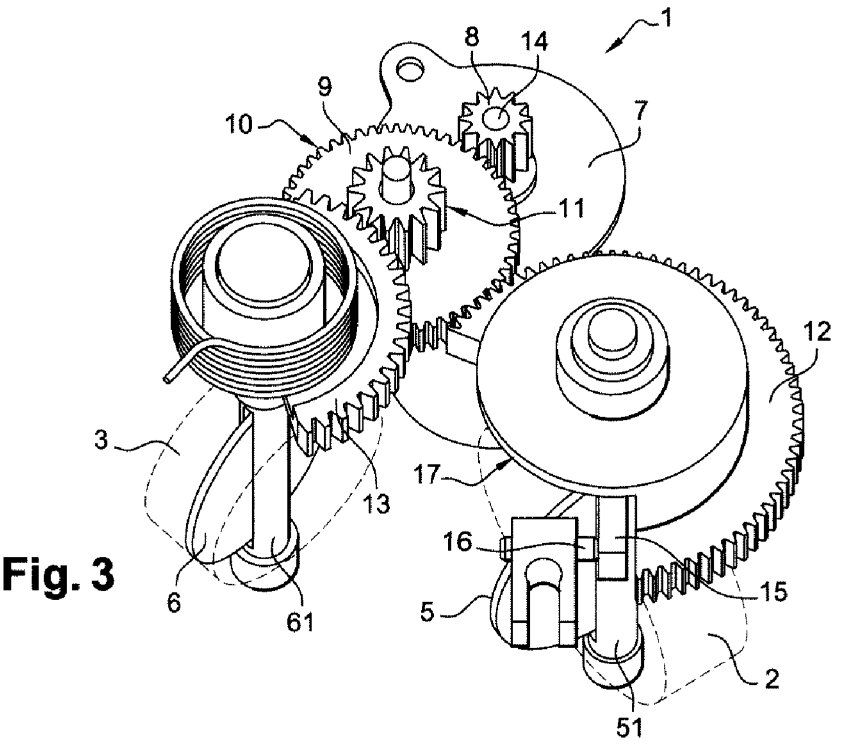
FIG. 3 is a perspective view of the drivetrain of a three-way valve with two flaps, according to the invention, with the air flap open and the gas flap closed.
Figure 4:
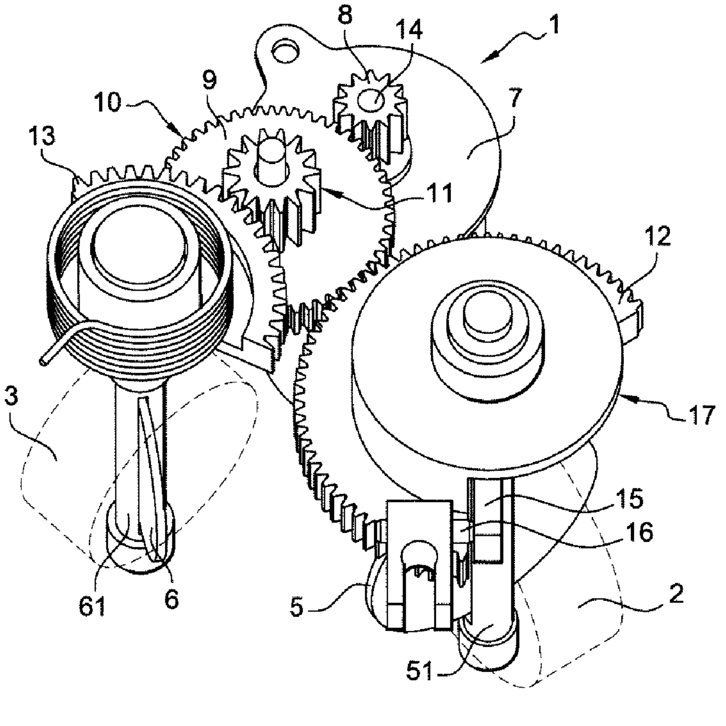
FIG. 4 is a view of the valve of FIG. 3, with the gas flap in a partially open position.
Figure 5:
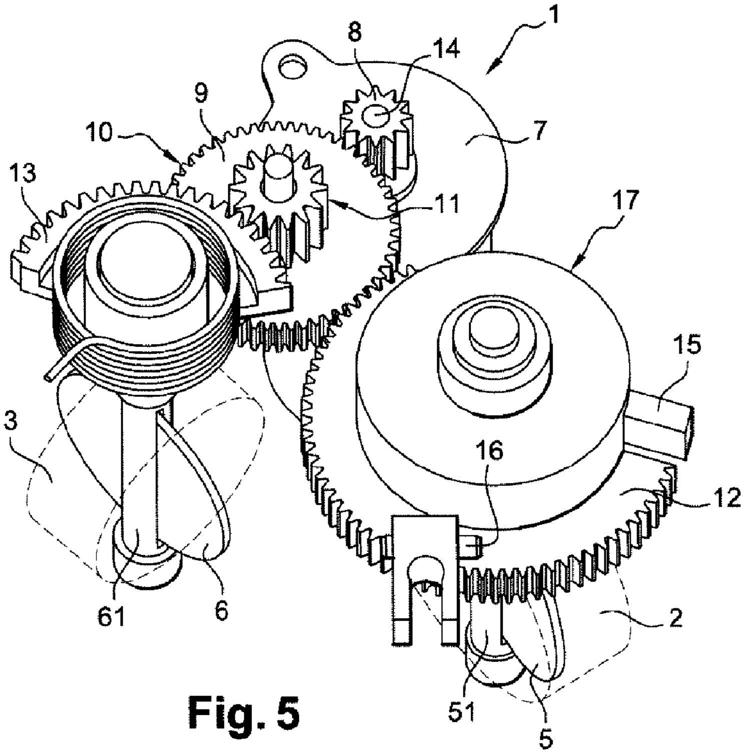
FIG. 5 is a view of the valve of FIG. 3 with the gas flap open and the air flap closed.

FIGS. 3, 4 and 5 show the annulus gears and gearwheels at various stages in the rotation of the pinion 8.

From FIG. 3 to FIG. 4, the annulus gears 12 and 13 are driven in the counterclockwise direction so as causing the flap 6 to open while the flap 5 remains immobile, because of the angular cutout 17. In the position of FIG. 4, one of the edges of this cutout 17 has come into contact with the pin 15.

The annulus gear 12 therefore continues to rotate in the direction of the position depicted in FIG. 5, the pin 15 (and therefore the flap 5) therefore being rotated. The flap 5 therefore closes with a temporal offset permitted by the cutout 17.

Figure 6:
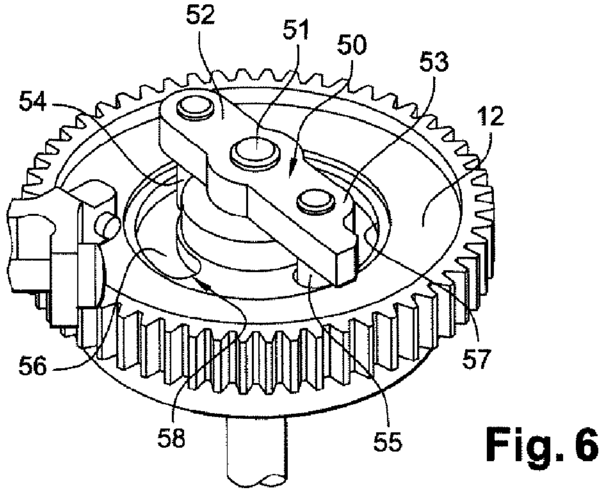
FIG. 6 is a partial perspective view of the drivetrain of a three-way valve according to an alternative form of the mechanism for temporally phase shifting the closing of the air flap in relation to the opening of the gas flap.
Figure 7:
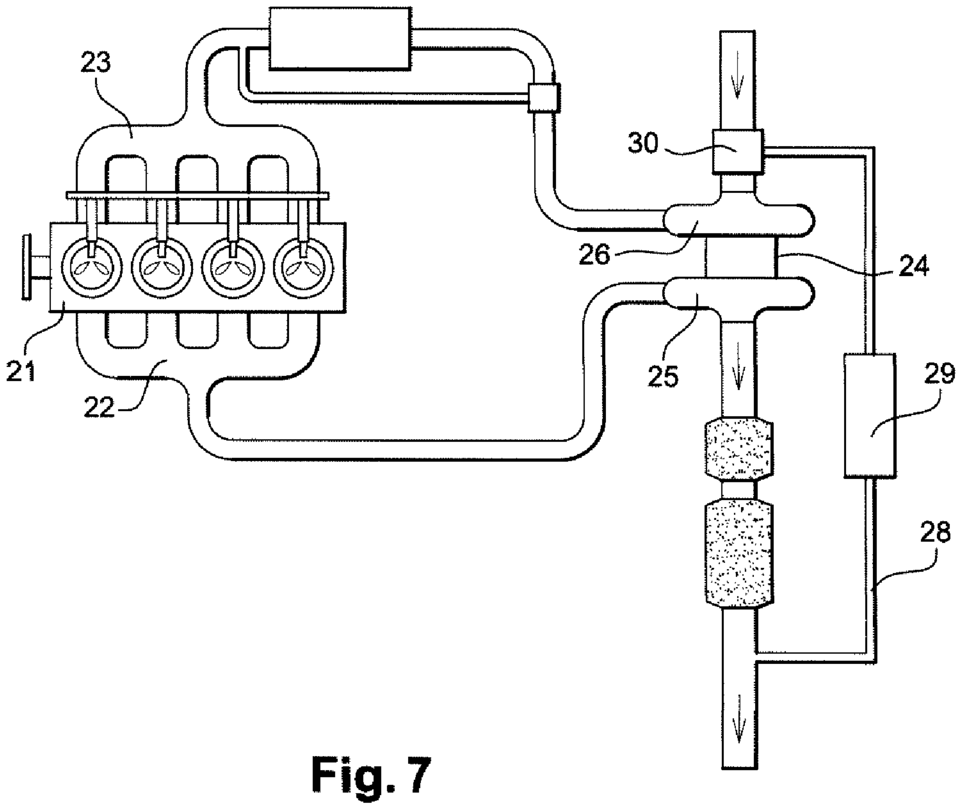
FIG. 7 is a simplified depiction of the EGR loop used according to the mode illustrated in FIG. 1.

A variant embodiment of the phase shifting mechanism is depicted in FIG. 6. In this variant, a crossmember 50 with two radial arms 52, 53 is mounted on the shaft 51 of the flap 5. Each of the arms 52, 53 has at its end a driving pin 54, 55 running substantially parallel to the shaft 51.

Two circular slots 56, 57 for driving the pins 54, 55 in a circular translational movement are formed in the annulus gear 12. The pins 54, 55 respectively run in these two slots 56, 57.

As long as the pins 54, 55 are not resting against one of the end walls 58 of the slots 56, 67, the shaft 51 and the air flap 5 cannot be rotated. As soon as the pins 54, 55 come into abutment against the respective end walls of the two slots 56, 57, the annulus gear 12 drives them along with it, causing the flap 5 to rotate.

To ensure correct operation of the three-way valve, it is necessary for the angle subtended by the slots to be less than 180°. If $\alpha_g$ is the angle through which the gas flap 6 rotates, $\alpha_a$, is the angle through which the air flap 5 rotates, then equation (1) must be satisfied $$(\alpha_g - \alpha_a) \times \frac{\alpha_g}{\alpha_a} < 180 \quad (1)$$

Figure 2A:
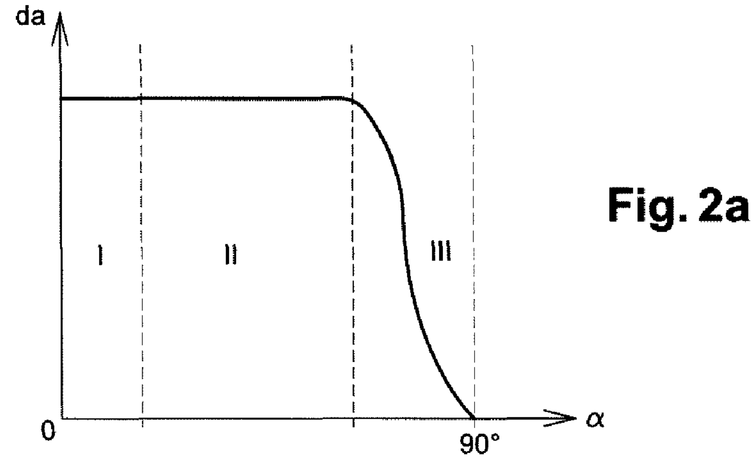
Figure 2B:
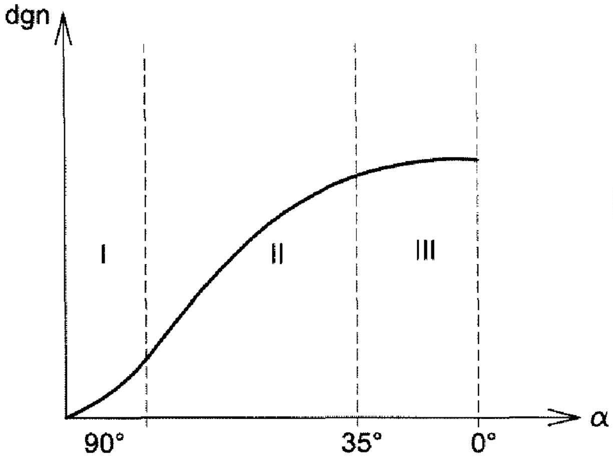
Figure 2C:
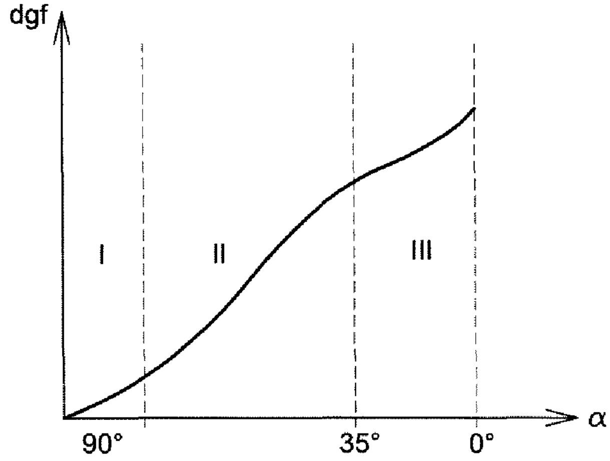

If we consider $\alpha_g$=90° (FIG. 2*b*), then the angle $\alpha_a$ through which the air flap 5 rotates must satisfy equation (2)

$$\alpha_a > 30° \quad (2)$$

The gearing ratio $$R = \frac{\alpha g}{\alpha a}$$

must then satisfy equation (3)

$$R < 3 \quad (3)$$

In the example mentioned hereinabove, the parameters considered were $$R = \frac{15.67}{6.67} = 2.35$$

The circular slots 56, 57 are formed in the annulus gear 12 with respect to the toothed sector of the annulus gear 12 giving due consideration to the size of the angle through which the gas flap 6 rotates before the air flap 5 begins to rotate.

The valve that has just been described is notable through the singularity of its control, being controlled solely by the DC motor 7, making it more cost-effective and compact.

This control can be achieved using an H-bridge, well known to those skilled in the art, with two pairs of switches in series and the component that is to be controlled—in this instance the motor—connected to the two mid-points of the two pairs of switches, the two pairs being connected between a battery voltage and ground.

The invention claimed is:

1. A three-way valve (1) having three paths (2, 3, 4) with two flaps (5, 6) respectively positioned in two of the three paths (2, 3) of the valve and comprising means (7-12) for controlling and actuating the flaps (5, 6) to make the flaps (5, 6) pivot from one to the other of two positions in which the paths (2, 3) are either open or closed, characterized in that single control means (7) are provided for both flaps (5, 6), and there are actuating means (9-13) designed to be controlled by the single control means (7) and to actuate the two flaps (5, 6)

with a temporal phase shift wherein the actuating means (9-13) comprise an intermediate gear wheel (9) with two coaxial tooth sets (10μ, 11) with the intermediate gear wheel (9) interacting directly with two annulus gears (12, 13) that actuate the two flaps (5, 6) by rotation.

2. The three-way valve (1) as claimed in claim 1, in which the single control means comprise a dc motor (7).

3. The three-way valve (1) as claimed in claim 2, in which the actuating means comprise a drivetrain (9-13), the input to which comes from a pinion (8) of a shaft (14) of the dc motor (7) and which meshes with the intermediate gear wheel (9) with two coaxial tooth sets (10, 11).

4. The three-way valve (1) as claimed in claim 3, wherein the two annulus gears (12, 13) rotate as one with the two flaps (5, 6).

5. The three-way valve (1) as claimed in claim 1, is further defined as an EGR loop valve in which the flaps (5, 6) are positioned in two inlet paths (2, 3), with an outlet path (4) downstream from the two inlet paths (2, 3) and connected to an intake manifold of a motor vehicle internal combustion engine.

6. The three-way valve (1) as claimed in claim 1, wherein the two coaxial tooth sets (10, 11) are further defined as a peripheral tooth set (10) and a central tooth set (11) each disposed on a shaft (14) with the peripheral tooth set (10) interacting directly with one of the two annulus gears (12) and the central tooth set (11) interacting directly with another one of the two annulus gears (13).

7. The three-way valve (1) as claimed in claim 6, wherein the single control means (7) further includes a pinion (8) interacting directly with the peripheral tooth set (10) for rotating the shaft (14) and the central tooth set (11).

* * * * *

UNITED STATES PATENT AND TRADEMARK OFFICE

CERTIFICATE OF CORRECTION

PATENT NO. : 8,561,645 B2
APPLICATION NO. : 12/811116
DATED : October 22, 2013
INVENTOR(S) : Leroux et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 517 days.

Signed and Sealed this
Third Day of March, 2015

Michelle K. Lee

Michelle K. Lee
*Deputy Director of the United States Patent and Trademark Office*